(12) United States Patent
Huang et al.

(10) Patent No.: US 7,825,914 B2
(45) Date of Patent: Nov. 2, 2010

(54) TRIGGER OPERATED PORTABLE ELECTRONIC DEVICE

(75) Inventors: Chih-Chiang Huang, Hsin-Tien (TW);
Cheng Yao, Hsin-Tien (TW);
Chung-Tsung Wang, Hsin-Tien (TW)

(73) Assignees: Giga-Byte Communications, Inc., Taipei County (TW); Giga-Byte Technology Co., Ltd., Taipei County (TW)

( * ) Notice: Subject to any disclaimer, the term of this patent is extended or adjusted under 35 U.S.C. 154(b) by 814 days.

(21) Appl. No.: 11/723,497

(22) Filed: Mar. 20, 2007

(65) Prior Publication Data
US 2008/0231614 A1 Sep. 25, 2008

(51) Int. Cl.
*G06F 3/033* (2006.01)
*G09G 5/00* (2006.01)
*H04M 1/00* (2006.01)

(52) U.S. Cl. .......... 345/179; 345/156; 455/567
(58) Field of Classification Search .......... 345/156, 345/179, 180; 455/550.1, 566, 567
See application file for complete search history.

(56) References Cited

U.S. PATENT DOCUMENTS

| 6,191,743 | B1 * | 2/2001 | Jones et al. | 343/702 |
| 6,262,684 | B1 * | 7/2001 | Stewart et al. | 343/702 |
| 6,575,596 | B2 * | 6/2003 | Butt | 362/259 |

* cited by examiner

*Primary Examiner*—Srilakshmi K Kumar
(74) *Attorney, Agent, or Firm*—Rabin & Berdo, P.C.

(57) ABSTRACT

A trigger operated portable electronic device is provided. A user only needs to insert a touch pen having a first metal contact into a touch pen receiving slot having second metal contacts. When the first metal contact is electrically coupled to the second metal contacts, the portable electronic device can be triggered to perform corresponding operating procedures. Thus, the convenience of operating the portable electronic device is improved.

16 Claims, 4 Drawing Sheets

TRIGGER OPERATED PORTABLE ELECTRONIC DEVICE

BACKGROUND OF THE INVENTION

1. Field of Invention

The present invention relates to a portable electronic device, and more particularly, to a trigger operated portable electronic device.

2. Related Art

With the development of electronic technology, various electronic devices are used in people's daily life. The electronic devices have many excellent functions, such as multimedia playing, wireless communication service, satellite positioning and navigation, image capturing and gaming, which bring much convenience to the daily life. Taking portable electronic devices as an example, the portable electronic devices are highly welcomed in the market due to their portability.

As for the current portable electronic devices, with the trend of human design of operation interfaces, most portable electronic devices integrate the function of touch operation. Taking a PDA as an example, the PDA uses a handheld computer as a personal digital assistant, which primarily has the basic functions of calendar, schedule, notebook, and address book. So far, the PDA has been developed to realize synchronous data transmission with a computer, and various applications can be installed on the PDA to expand its functions. The expanded functions include online email receiving and sending, stock information browsing, accounting, electronic book browsing, gaming, spreadsheet utilization, database application, life information providing, and wireless communication, and so on. Among others, the wireless communication function requires antennae and wireless signal processing circuits. Currently, most of the portable electronic devices adopt the built-in antenna design, that is, the antenna bodies are disposed inside cases. Thus, though the appearance is improved, to a certain electronic device, the gain of the antenna is affected to some extent in practice. Moreover, when operating on the expanded functions, a user has to click menus on a screen with a touch pen to trigger and execute corresponding applications. Therefore, in case of a multi-layer menu, the user must click the menu sequentially to enter the next layer until a desired functional item appears, so the operation is still not convenient enough.

SUMMARY OF THE INVENTION

Accordingly, the present invention is directed to provide a trigger operated portable electronic device. In order to trigger the portable electronic device to execute corresponding operating procedures, a user only needs to insert a touch pen into a touch pen receiving slot or a sound source output hole. Thus, the convenience of operating the portable electronic device is improved.

The trigger operated portable electronic device disclosed by the present invention includes a touch pen having a pen body, a pen head, and a first metal contact, and a touch pen receiving slot having an accommodation space for accommodating the touch pen. A plurality of second metal contacts is disposed in the touch pen receiving slot, and each of the second metal contacts at least connects two kinds of circuits. The circuits connected to each of the second metal contacts, for example, can be an earphone sound source circuit, an antenna signal processing circuit, or a charging circuit. When the first metal contact of the touch pen is coupled to the second metal contacts in the touch pen receiving slot, the portable electronic device is triggered to execute at least an operating procedure with the touch pen.

According to the trigger operated portable electronic device, by inserting the touch pen into the touch pen receiving slot at different positions, the portable electronic device is triggered to execute different operating procedures, so as to improve the convenience of operating the portable electronic device. Meanwhile, the touch pen is made of a metal material, so when the touch pen triggers a wireless communication function of the portable electronic device, the touch pen can also serve as an antenna of the portable electronic device, and the length of the antenna can be adjusted according to a frequency range in which the antenna works. Thus, the cost for manufacturing the antenna of the portable, electronic device is saved, and the functionality of the touch pen is enhanced.

The features and practice of the preferred embodiments of the present invention will be illustrated in detail below with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1A:
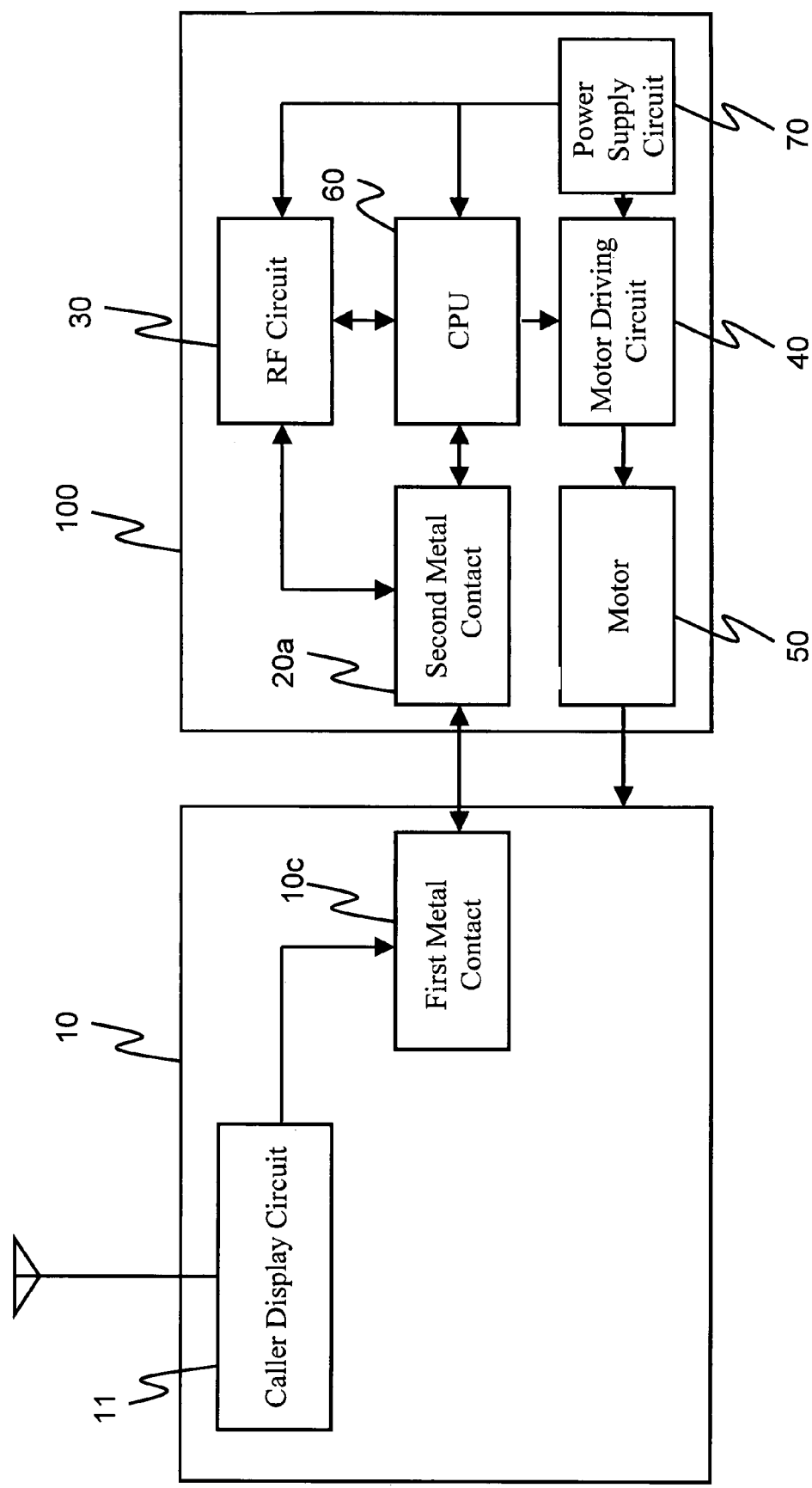
FIG. 1A is a system block diagram of a first embodiment of the present invention.

FIG. 1A is a system block diagram of a first embodiment of the present invention. As shown in FIG. 1A, the trigger operated portable electronic device of the present invention includes a touch pen 10 and a portable electronic device 100.

Figure 2A:
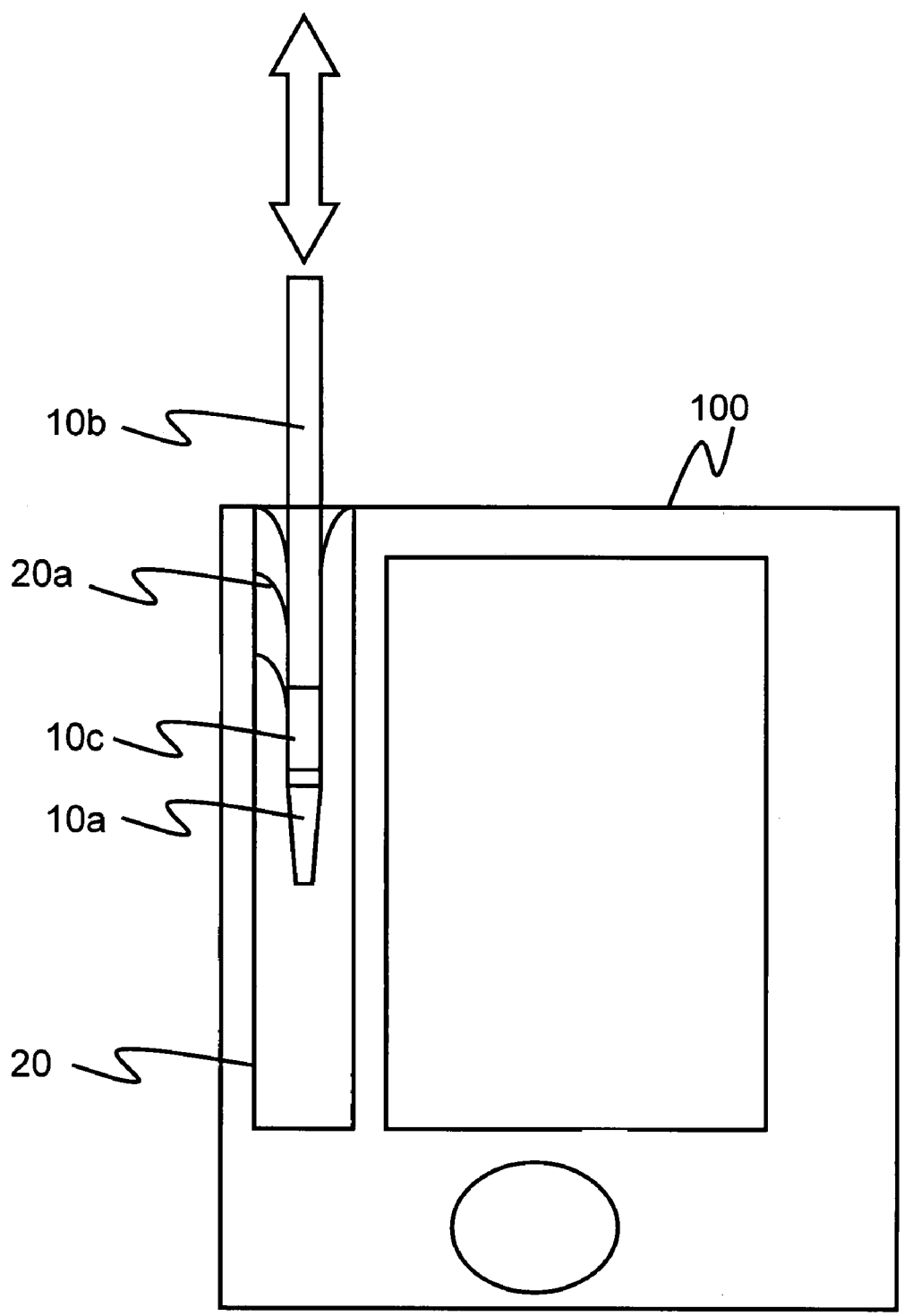
FIG. 2A is a schematic view of operations of the first embodiment of the present invention.

The touch pen 10 is used to enable a user to operate the portable electronic device 100. A caller display circuit 11 and a first metal contact 10c are disposed in the touch pen 10, and the caller display circuit 11 is electrically coupled to a pen body 10b (as shown in FIG. 2A) of the touch pen 10 and the first metal contact 10c. The pen body 10b of the touch pen 10 is used as an antenna to sense an incoming call signal, and is made of a metal material (for example, copper or iron). When the caller display circuit 11 senses the incoming call signal, a display module (not shown) in the caller display circuit 11 produces a luminous effect, so as to remind the user.

The portable electronic device 100 includes second metal contacts 20a, an RF circuit 30, a motor driving circuit 40, a motor 50, a CPU 60, and a power supply unit 70. The units and circuits will be illustrated in detail below.

The second metal contacts 20a are electrically coupled to the RF circuit 30 and the CPU 60. When the second metal contacts 20a are electrically coupled to the first metal contact 10c of the touch pen 10, the CPU 60 executes at least an operating procedure according to the number of the contacts that are electrically coupled. The material of the second metal contacts 20a, for example, can be copper, iron, or other conductive materials.

The RF circuit 30 is electrically coupled to the second metal contacts 20a, the CPU 60, and the power supply unit 70 respectively, for processing a wireless signal received by the pen body 10b of the touch pen 10, so as to provide the wireless communication service.

The motor driving circuit 40 is electrically coupled to the motor 50, the CPU 60, and the power supply unit 70 respectively, for generating a control signal and transmitting the control signal to the motor 50, so as to drive the motor 50 to operate. Here, the control signal is generated according to a control command from the CPU 60.

The motor 50 is electrically coupled to the motor driving circuit 40, for operating according to the control signal output by the motor driving circuit 40, and drives the touch pen 10 to move in the touch pen receiving slot 20 (as shown in FIG. 2A) through the combination of gears or other mechanisms and elements.

The CPU 60 is electrically coupled to the second metal contacts 20a, the RF circuit 30, the motor driving circuit 40, and the power supply unit 70 respectively, and is responsible for processing signals of various units and circuits. The CPU 60 is the core module of the portable electronic device 100.

The power supply unit 70 is electrically coupled to the RF circuit 30, the motor driving circuit 40, and the CPU 60 respectively, for supplying the electric power required during the operation of the units and circuits of the portable electronic device 100.

Figure 1B:
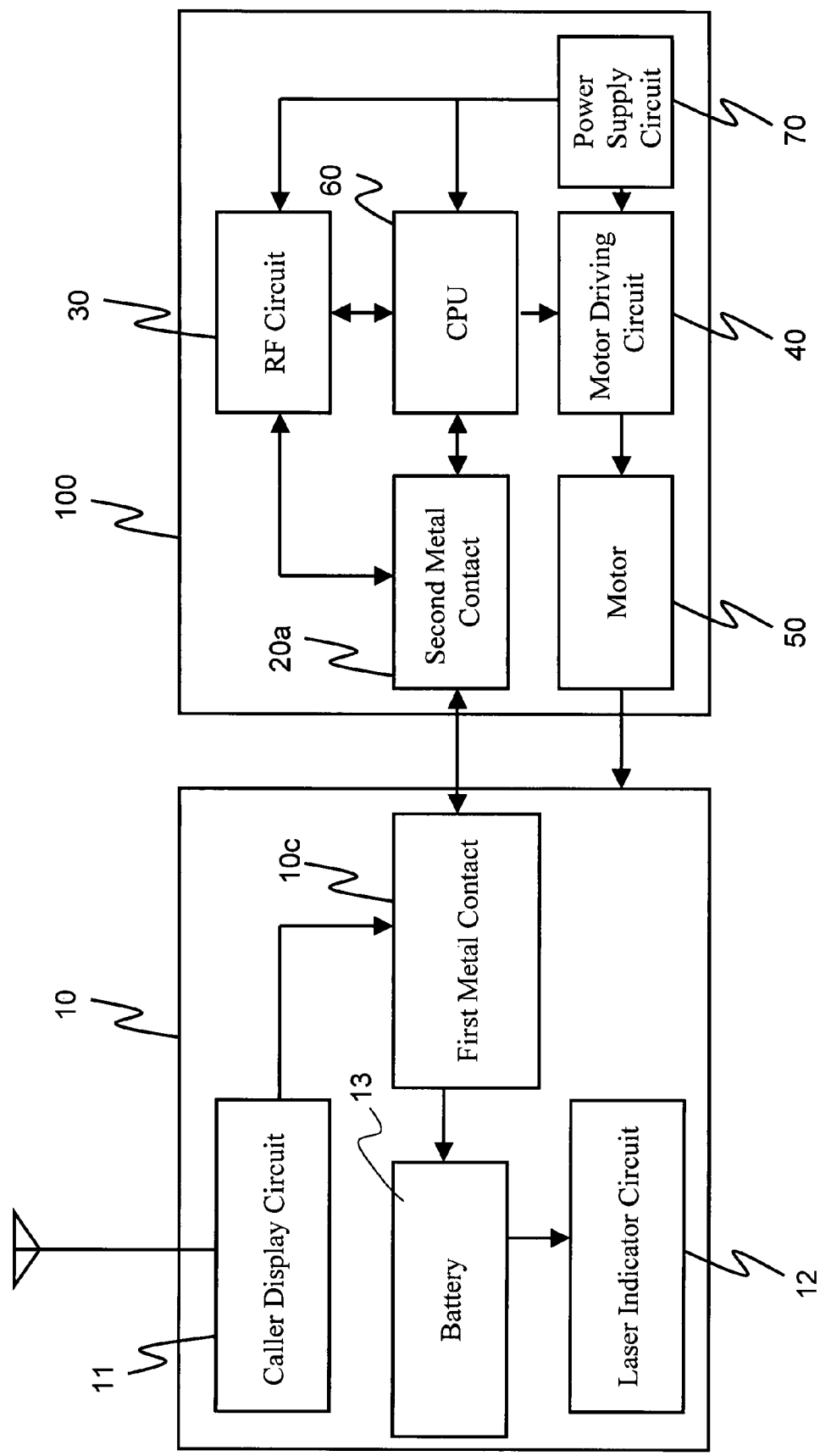
FIG. 1B is a system block diagram of a second embodiment of the present invention.

FIG. 1B is a system block diagram of a second embodiment of the present invention. As shown in FIG. 1B, the trigger operated portable electronic device of the present invention includes a touch pen 10 and a portable electronic device 100. The difference between the second embodiment and the first embodiment is that a laser indicator circuit 12 and a battery 13 are disposed in the touch pen 10 of the second embodiment. Other parts of the second embodiment are the same as the first embodiment, and will not be described herein again.

The laser indicator circuit 12 is electrically coupled to the first metal contact 10c and the battery 13, for emitting a laser indication signal.

The battery 13 is electrically coupled to the first metal contact 10c and the laser indicator circuit 12 respectively, for providing the electric power required during the operation of the laser indicator circuit 12, and the battery 13 is a rechargeable battery. When the first metal contact 10c is electrically coupled with the second metal contacts 20a, the CPU 60 executes a charging procedure according to the number of the contacts that are electrically coupled, such that the power supply unit 70 in the portable electronic device 100 charges the battery 13 in the touch pen 10. Here, the first metal contacts 10c are electrically coupled to the positive pole and the negative pole of the battery 13 for charging.

FIG. 2A is a schematic view showing operations of the first embodiment of the present invention. As shown in FIG. 2A, the trigger operated portable electronic device of the present invention includes the touch pen 10, the touch pen receiving slot 20, and the portable electronic device 100.

The touch pen 10 has the pen body 10b, the pen head 10a, and the first metal contact 10c. The pen body 10b, for example, can be made of a material of metal, plastic steel, or acrylonitrile butadiene styrene (ABS) resin. When the pen body 10b is made of a metal material, it can serve as an antenna of the portable electronic device 100.

The pen head 10a is fixed to one end of the pen body, and the pen head 10a, for example, can be made of a material of plastic steel or ABS resin.

The first metal contact 10c is inlaid in the surface of the touch pen 10, for electrically coupling the second metal contacts 20a in the touch pen receiving slot 20, so as to trigger the portable electronic device 100 to execute at least an operating procedure with the touch pen 10. The operating procedure, can be, for example, starting a broadcast signal playing application (for example, TV or radio), or starting a wireless communication system (for example, a cell phone communication system (GSM/GPRS) or a wireless local area network (WLAN)).

The touch pen receiving slot 20 has an accommodation space for accommodating the touch pen 10, and a plurality of second metal contacts 20a is disposed in the touch pen receiving slot 20. Each of the second metal contacts 20a at least connects two kinds of circuits. The circuits connected to each of the second metal contacts 20a of the touch pen receiving slot 20, for example, can be an earphone sound source circuit, an antenna signal processing circuit, or a charging circuit.

When the user intends to start the broadcast signal playing application (for example, TV or radio), the motor 50 will push the touch pen 10 to a first predetermined position in the touch pen receiving slot 20, such that the first metal contact 10c of the touch pen 10 is electrically coupled to the second metal contacts 20a. Thus, the touch pen 10 serves as an antenna of the portable electronic device 100. Similarly, when the user starts the wireless communication system (for example, the cell phone communication system (GSM/GPRS)), the motor 50 will push the touch pen 10 to a second predetermined position in the touch pen receiving slot 20, so as to adjust the length of the antenna.

Figure 2B:
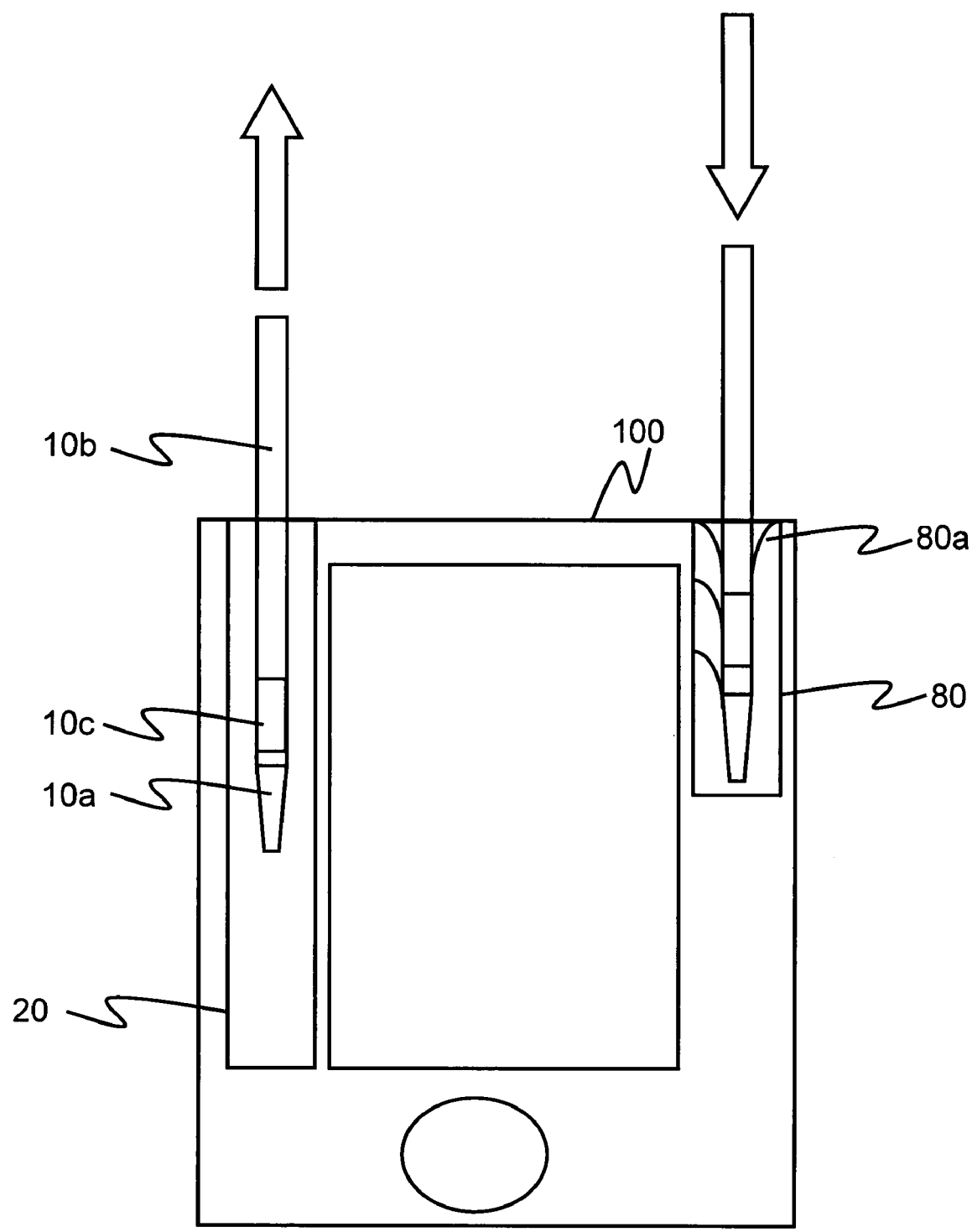
FIG. 2B is a schematic view of operations of a third embodiment of the present invention.

FIG. 2B is a schematic view showing operations of a third embodiment of the present invention. As shown in FIG. 2B, the trigger operated portable electronic device of the present invention includes a touch pen 10, a touch pen receiving slot 20, a sound source output hole 80, and a portable electronic device 100. The difference between the third embodiment and the first embodiment is that metal contacts 80a of the third embodiment are disposed in the sound source output hole 80. Other parts of the third embodiment are the same as the first embodiment, and will not be described herein again.

The touch pen receiving slot 20 has an accommodation space for accommodating the touch pen 10.

A plurality of metal contacts 80a is disposed in the sound source output hole 80, and each of the metal contacts 80a at least connects two kinds of circuits. The circuits connected to each of the metal contacts 80a in the sound source output hole 80, for example, can be an earphone sound source circuit, an antenna signal processing circuit, or a charging circuit.

When the user intends to start the broadcast signal playing application (for example, TV or radio), the touch pen 10 is drawn out of the touch pen receiving slot 20, and is inserted into the sound source output hole 80 at a first predetermined position. Thus, the first metal contact 10c of the touch pen 10 is electrically coupled to the metal contacts 80a, so as to trigger the portable electronic device 100 to execute the broadcast signal playing application, and the touch pen 10 serves as an antenna of the portable electronic device 100. Similarly, when the user intends to start the charging procedure, the touch pen 10 is inserted into the sound source output hole 80 at a second predetermined position. Thus, the first metal contact 10c of the touch pen 10 is electrically coupled to other metal contacts 80a, so as to trigger the portable electronic device 100 to execute the charging procedure, such that the portable electronic device 100 charges the battery 13 in the touch pen 10.

In view of the above, according to the trigger operated portable electronic device of the present invention, by inserting the touch pen into the touch pen receiving slot at different positions, the portable electronic device is triggered to execute different operating procedures, so as to improve the convenience of operating the portable electronic device. Meanwhile, as the touch pen is made of a metal material, when the touch pen triggers the wireless communication function of the portable electronic device, the touch pen also serves as an antenna of the portable electronic device. The length of the antenna can be adjusted according to a frequency range in which the antenna works. Thus, the cost for manufacturing the antenna of the portable electronic device is saved, and the functionality of the touch pen is enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A trigger operated portable electronic device, comprising:
   a touch pen, having a pen body, a pen head, and a first metal contact; and
   a touch pen receiving slot, having an accommodation space, for accommodating the touch pen, wherein a plurality of second metal contacts is disposed in the touch pen receiving slot, and the second metal contacts at least connect two kinds of circuits;
   a caller display circuit, disposed in the touch pen, to produce a luminous effect according to an incoming call signal;
   wherein when the first metal contact of the touch pen is electrically coupled to the second metal contacts in the touch pen receiving slot, the portable electronic device is triggered to execute at least an operating procedure with the touch pen.

2. The trigger operated portable electronic device as claimed in claim 1, wherein the touch pen serves as an antenna of the portable electronic device.

3. The trigger operated portable electronic device as claimed in claim 2, further comprising a motor, for driving the touch pen to move in the touch pen receiving slot, such that the touch pen serves as the antenna of different lengths.

4. The trigger operated portable electronic device as claimed in claim 1, wherein the touch pen receiving slot is a sound source output hole.

5. The trigger operated portable electronic device as claimed in claim 1, wherein the circuits connected to the second metal contacts of the touch pen receiving slot are combinations of an earphone sound source circuit, an antenna signal processing circuit, or a charging circuit.

6. A trigger operated portable electronic device, comprising:
   a touch pen, having a pen body, a pen head, and a plurality of first metal contacts, the touch pen further comprising:
   a laser indicator circuit, for emitting a laser indication signal; and
   a battery, electrically coupled to the first metal contacts and the laser indicator circuit, for supplying electric power required during operation of the laser indicator circuit; and
   a touch pen receiving slot, having an accommodation space, for accommodating the touch pen, wherein a plurality of second metal contacts is disposed in the touch pen receiving slot, and the second metal contacts at least connect two kinds of circuits;
   wherein when the first metal contacts of the touch pen are electrically coupled to the second metal contacts of the touch pen receiving slot, the portable electronic device is triggered to execute a charging procedure, such that the portable electronic device charges the battery in the touch pen.

7. The trigger operated portable electronic device as claimed in claim 6, wherein the first metal contacts are electrically coupled to positive pole and negative pole of the battery.

8. The trigger operated portable electronic device as claimed in claim 6, wherein the touch pen serves as an antenna of the portable electronic device.

9. The trigger operated portable electronic device as claimed in claim 8, further comprising a motor, for driving the touch pen to move in the touch pen receiving slot, such that the touch pen serves as the antenna of different lengths.

10. The trigger operated portable electronic device as claimed in claim 6, wherein a caller display circuit is further disposed in the touch pen, for producing a luminous effect according to an incoming call signal.

11. The trigger operated portable electronic device as claimed in claim 6, wherein the touch pen receiving slot is a sound source output hole.

12. The trigger operated portable electronic device as claimed in claim 6, wherein another circuit connected to the second metal contacts of the touch pen receiving slot is an earphone sound source circuit or an antenna signal processing circuit.

13. A trigger operated portable electronic device, comprising:
   a touch pen, having a pen body, a pen head, and a first metal contact; and
   a touch pen receiving slot, having an accommodation space, for accommodating the touch pen, wherein a plurality of second metal contacts is disposed in the touch pen receiving slot, and the second metal contacts at least connect two kinds of circuits, wherein the touch pen receiving slot is a sound source output hole;
   wherein when the first metal contact of the touch pen is electrically coupled to the second metal contacts in the touch pen receiving slot, the portable electronic device is triggered to execute at least an operating procedure with the touch pen.

14. The trigger operated portable electronic device as claimed in claim 13, wherein the touch pen serves as an antenna of the portable electronic device.

15. The trigger operated portable electronic device as claimed in claim 14, further comprising a motor, for driving the touch pen to move in the touch pen receiving slot, such that the touch pen serves as the antenna of different lengths.

16. The trigger operated portable electronic device as claimed in claim 13, wherein the circuits connected to the second metal contacts of the touch pen receiving slot are combinations of an earphone sound source circuit, an antenna signal processing circuit, or a charging circuit.

* * * * *